United States Patent
Kim et al.

(10) Patent No.: US 11,860,459 B2
(45) Date of Patent: Jan. 2, 2024

(54) VIEWING ANGLE NARROWING STRUCTURE AND DISPLAY DEVICE HAVING THE SAME

(71) Applicant: Samsung Display Co., LTD., Yongin-si (KR)

(72) Inventors: Yong Seok Kim, Seoul (KR); Youngchan Kim, Incheon (KR); Minhee Son, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/159,399

(22) Filed: Jan. 25, 2023

(65) Prior Publication Data
US 2023/0266610 A1    Aug. 24, 2023

(30) Foreign Application Priority Data

Feb. 22, 2022    (KR) .......................... 10-2022-0023026

(51) Int. Cl.
| | | |
|---|---|---|
| *G02F 1/1335* | (2006.01) | |
| *G02F 1/13* | (2006.01) | |
| *G02F 1/13357* | (2006.01) | |
| *G02F 1/1343* | (2006.01) | |
| *G02F 1/1368* | (2006.01) | |

(52) U.S. Cl.
CPC .......... *G02F 1/1323* (2013.01); *G02F 1/1368* (2013.01); *G02F 1/133514* (2013.01); *G02F 1/133602* (2013.01); *G02F 1/134309* (2013.01)

(58) Field of Classification Search
CPC ............. G02F 1/1323; G02F 1/133602; G02F 1/134309; G02F 1/1368
See application file for complete search history.

(56) References Cited

U.S. PATENT DOCUMENTS

| | | |
|---|---|---|
| 10,475,850 B2 | 11/2019 | Hsiang et al. |
| 2005/0264471 A1 | 12/2005 | Yamazaki et al. |
| 2016/0197131 A1 | 7/2016 | Park et al. |
| 2018/0145118 A1* | 5/2018 | Kim ..................... H10K 59/121 |
| 2019/0179208 A1 | 6/2019 | Sato et al. |
| 2020/0005718 A1 | 1/2020 | Fattal |

(Continued)

FOREIGN PATENT DOCUMENTS

| | | |
|---|---|---|
| KR | 1020100058985 A | 6/2010 |
| KR | 1020170010929 A | 2/2017 |

OTHER PUBLICATIONS

European Search Report for European Patent Application No. 23157417.9 dated Jul. 17, 2023.

*Primary Examiner* — James A Dudek
(74) *Attorney, Agent, or Firm* — CANTOR COLBURN LLP

(57) ABSTRACT

A display device includes a first emitting area and a second emitting area which is spaced apart from the first emitting area, a first electrode facing a second electrode with a liquid crystal layer therebetween, each of the first electrode, the second electrode and the liquid crystal layer corresponding to the first emitting area, a third electrode facing a fourth electrode with a light emitting layer therebetween, each of the third electrode, the fourth electrode and the light emitting layer corresponding to the second emitting area, and the fourth electrode defining an opening in the fourth electrode which corresponds to the first emitting area.

20 Claims, 12 Drawing Sheets

(56) References Cited

U.S. PATENT DOCUMENTS

| | | | |
|---|---|---|---|
| 2020/0257173 A1* | 8/2020 | Tsuchiya | G02F 1/134309 |
| 2021/0026188 A1 | 1/2021 | Ohno et al. | |
| 2021/0074779 A1 | 3/2021 | Park | |
| 2021/0232007 A1* | 7/2021 | Qiu | G02F 1/136209 |
| 2021/0265537 A1 | 8/2021 | Shin et al. | |
| 2022/0043300 A1 | 2/2022 | Kim | |

* cited by examiner

VIEWING ANGLE NARROWING STRUCTURE AND DISPLAY DEVICE HAVING THE SAME

This application claims priority to Korean Patent Application No. 10-2022-0023026, filed on Feb. 22, 2022, and all the benefits accruing therefrom under 35 U.S.C. § 119, the content of which in its entirety is herein incorporated by reference.

BACKGROUND

(1) Field

Implementations of the invention relate generally to a display device which adjusts a viewing angle.

(2) Description of the Related Art

A display device may include a display area displaying an image. The display device may have a wide viewing angle, and accordingly, the image displayed on the display area may be viewable from various angles.

When the display device having the wide viewing angle is used in a public place, privacy of an image being displayed may also be viewable from the various angles.

SUMMARY

When a display device having the wide viewing angle is used in a public place, privacy of an image being displayed may be exposed, owing to the image being viewable from various angles. Accordingly, to protect privacy of an image displayed by a display device, an improved display device is desired in which a wide viewing angle mode in which the image is displayed in a wide viewing angle, and a narrow viewing angle mode in which the image is displayed in a narrow viewing angle, are variously selectable.

Embodiments provide a display device which is selectively drivable in a wide viewing angle mode or a narrow viewing angle mode.

A display device according to an embodiment may include a backlight unit, a liquid crystal layer on the backlight unit, a first electrode under the backlight unit, where at least a portion of the first electrode overlaps a first emitting area, a second electrode on the backlight unit, where at least a portion of the second electrode overlaps the first emitting area, a third electrode on the second electrode, where at least a portion of the third electrode overlaps a second emitting area adjacent to the first emitting area, a pixel defining layer on the third electrode and defining a first opening exposing a portion of the third electrode and overlapping the second emitting area, a light emitting layer in the first opening, and a fourth electrode on the light emitting layer and defining a second opening overlapping the first emitting area.

In an embodiment, the display device may further include a barrier pattern disposed to overlap the first emitting area.

In an embodiment, the barrier pattern may include a first barrier pattern between the second electrode and the pixel defining layer.

In an embodiment, the pixel defining layer may define a third opening overlapping the first emitting area.

In an embodiment, the barrier pattern may include a second barrier pattern in the third opening.

In an embodiment, the barrier pattern may include a third barrier pattern between the backlight unit and the first electrode.

In an embodiment, the barrier pattern may include a plurality of first barrier patterns extending in a first direction and arranged in a second direction which crosses the first direction.

In an embodiment, the barrier pattern may further include a plurality of second barrier patterns extending in the second direction and arranged in the first direction.

In an embodiment, the backlight unit may emit straight light.

In an embodiment, the display device may further include a middle substrate between the second electrode and the third electrode, and including a driving transistor electrically connected to the third electrode.

In an embodiment, the middle substrate may define a groove overlapping the first emitting area and through which the straight light passes and remains straight.

In an embodiment, the display device may further include a color filter layer on the fourth electrode and overlapping the first emitting area and the second emitting area.

A display device according to an embodiment may include a first electrode, where at least a portion of the first electrode overlaps a first emitting area, a first pixel defining layer on the first electrode, and defining a first opening exposing a portion of the first electrode and overlapping the first emitting area, a first light emitting layer in the first opening, a second electrode on the first light emitting layer, a third electrode on the second electrode, where at least a portion of the third electrode overlaps a second emitting area adjacent to the first emitting area, a second pixel defining layer on the third electrode, and defining a second opening exposing a portion of the third electrode and overlapping the second emitting area, a second light emitting layer in the second opening, and a fourth electrode on the second light emitting layer, and defining a third opening overlapping the first emitting area.

In an embodiment, the display device may further include a barrier pattern disposed to overlap the first emitting area.

In an embodiment, the barrier pattern may include a first barrier pattern between the second electrode and the second pixel defining layer.

In an embodiment, the second pixel defining layer may define a fourth opening overlapping the first emitting area.

In an embodiment, the barrier pattern may include a second barrier pattern in the fourth opening.

In an embodiment, the barrier pattern may include a plurality of first barrier patterns extending in a first direction and arranged in a second direction which crosses the first direction.

In an embodiment, the barrier pattern may further include a plurality of second barrier patterns extending in the second direction and arranged in the first direction.

In an embodiment, the display device may further include a color filter layer on the fourth electrode, and overlapping the first emitting area and the second emitting area.

The display device according to an embodiment may include a backlight unit, a liquid crystal layer on the backlight unit, a first electrode under the backlight unit, where at least a portion of the first electrode overlaps a first emitting area, a second electrode on the backlight unit, where at least a portion of the second electrode overlaps the first emitting area, a third electrode on the second electrode, where at least a portion of the third electrode overlaps a second emitting area adjacent to the first emitting area, a pixel defining layer on the third electrode and defining a first opening exposing a portion of the third electrode and overlapping the second emitting area, a light emitting layer in the first opening, and a fourth electrode on the light emitting layer and defining a second opening overlapping the first emitting area. Accordingly, an image having a narrow viewing angle may be displayed in the first emitting area, and an image having a wide viewing angle may be displayed in the second emitting area.

The display device according to an embodiment may include a first electrode, where at least a portion of the first electrode overlaps a first emitting area, a first pixel defining layer on the first electrode, and defining a first opening exposing a portion of the first electrode and overlapping the first emitting area, a first light emitting layer in the first opening, a second electrode on the first light emitting layer, a third electrode on the second electrode, where at least a portion of the third electrode overlaps a second emitting area adjacent to the first emitting area, a second pixel defining layer on the third electrode, and defining a second opening exposing a portion of the third electrode and overlapping the second emitting area, a second light emitting layer in the second opening, and a fourth electrode on the second light emitting layer, and defining a third opening overlapping the first emitting area. Accordingly, an image having a narrow viewing angle may be displayed in the first emitting area, and an image having a wide viewing angle may be displayed in the second emitting area.

BRIEF DESCRIPTION OF THE DRAWINGS

The accompanying drawings, which are included to provide a further understanding of the invention and are incorporated in and constitute a part of this specification, illustrate embodiments of the invention together with the description.

DETAILED DESCRIPTION

Figure 1:
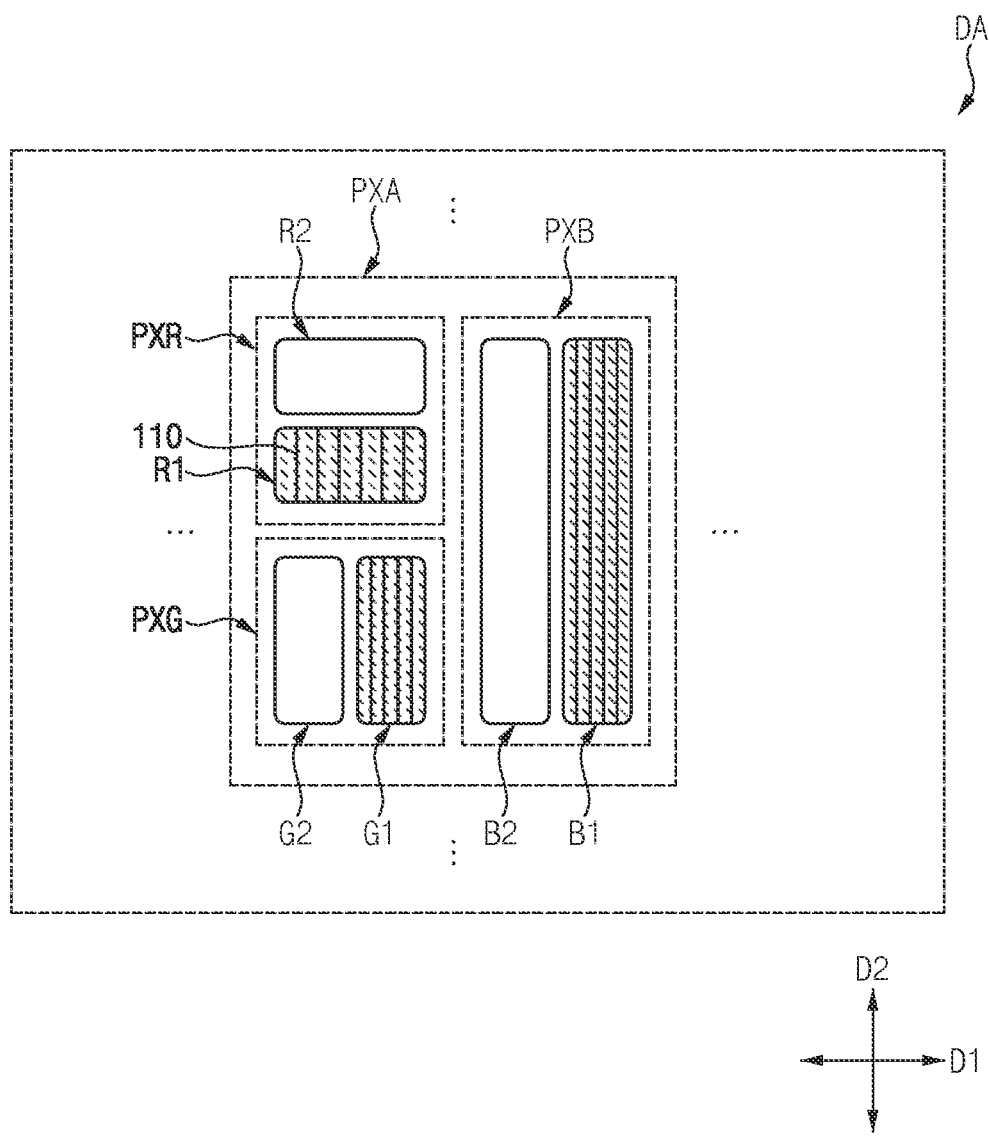
FIG. 1 and FIG. 2 are plan views illustrating a display area of a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Like reference numerals refer to like elements throughout. As used herein, a reference number may indicate a singular element or a plurality of the element. For example, a reference number labeling a singular form of an element within the drawing figures may be used to reference a plurality of the singular element within the text of specification.

It will be understood that when an element is referred to as being related to another element such as being "on" another element, it can be directly on the other element or intervening elements may be present therebetween. In contrast, when an element is referred to as being related to an element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Illustrative, non-limiting embodiments will be more clearly understood from the following detailed description in conjunction with the accompanying drawings.

Figure 2:
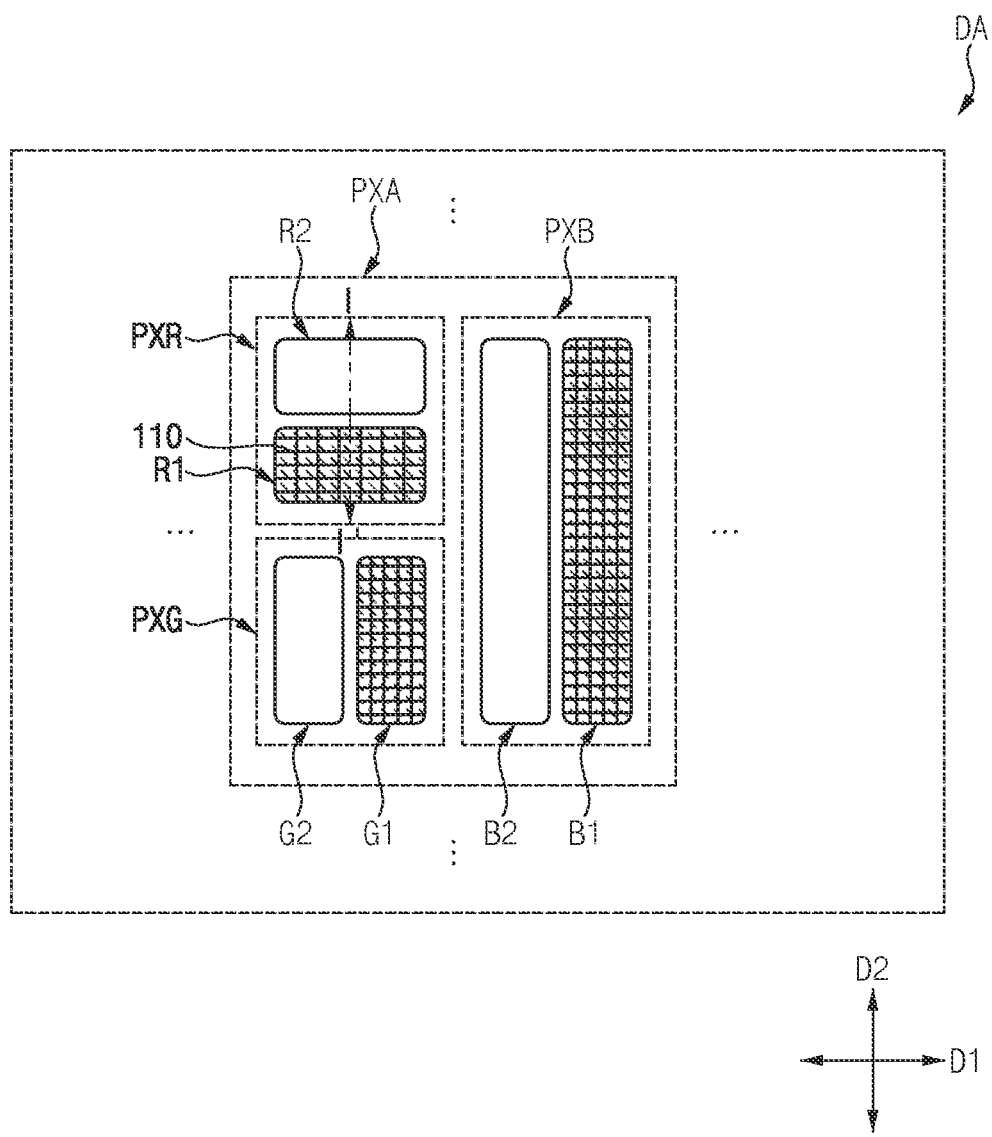

FIG. 1 and FIG. 2 are plan views illustrating a display area DA of a display device according to an embodiment. The display area DA may extend along a plane defined by a first direction D1 and a second direction D2 crossing each other. A thickness direction of components or layers of the display device may be extended along a third direction crossing the first direction D1 and the second direction D2.

Referring to FIG. 1, a plurality of pixels may be disposed in a display area DA. The plurality of pixels may include a first pixel PXR, a second pixel PRG, and a third pixel PXB. The first pixel PXR may be a pixel emitting red light, the second pixel PXG may be a pixel emitting green light, and the third pixel PXB may be a pixel emitting blue light. The plurality of pixels may be arranged in a first direction D1 and a second direction D2 crossing the first direction D1. A plurality of pixels may be disposed within a pixel area PXA.

Each of the plurality of pixels may include a first emitting area (e.g., first light emitting area) and a second emitting area (e.g., a second light emitting area). For example, the first pixel PXR may include first and second emitting areas R1 and R2, the second pixel PXG may include first and second emitting areas G1 and G2, and the third pixel PXB may include first and second emitting areas B1 and B2.

The first emitting area may be an area emitting light having a relatively narrow viewing angle, that is, a planar area at which light having the relatively narrow viewing angle is emitted. In an embodiment, a first barrier pattern 110 having a plurality of patterns arranged in (or along) the first direction D1, and extending in the second direction D2, may be disposed in the first emitting area. The first barrier pattern 110 may limit a viewing angle of light emitted from the first emitting area in the first direction D1. That is, respective patterns of the first barrier pattern 110 may limit a viewing angle of light emitted in a same direction in which the patterns are arranged. The second emitting area may be an area emitting light having a relatively wide viewing angle.

In an embodiment, when a display device is driven in a narrow viewing angle mode, light may be emitted from the first emitting area having the narrow viewing angle, and light may not be emitted from the second emitting area having the wide viewing angle which is wider than the narrow viewing angle along a same direction.

In an embodiment, when the display device is driven in a wide viewing angle mode, light may not be emitted from the first emitting area having the narrow viewing angle, and light may be emitted from the second emitting area having the wide viewing angle which is wider than the narrow viewing angle. In an embodiment, when the display device is driven in the wide viewing angle mode having the wide viewing angle which is wider than the narrow viewing angle, light may be emitted from each of the first emitting area having the narrow viewing angle and the second emitting area having the wide viewing angle.

Referring to FIG. 2, components disposed in a display area DA shown in FIG. 2 may be substantially same as the components disposed in the display area DA shown in FIG. 1, except for shape of the first barrier pattern 110 disposed in the first emitting area.

For example, as shown in FIG. 2, the first barrier pattern 110 may include a plurality of patterns arranged and extended in directions different from each other. The first barrier pattern 110 may include a vertical barrier pattern provided in plural arranged in the first direction D1 and extending in the second direction D2, and a horizontal barrier pattern provided in plural arranged in the second direction D2 and extending in the first direction D1. Accordingly, the first barrier pattern 110 may limit a viewing angle of light emitted from the first emitting area in both the first direction D1 and the second direction D2.

Planar shape of the first barrier pattern 110 is not limited to the planar shapes of the first barrier pattern 110 illustrated in FIG. 1 and FIG. 2. The first barrier pattern 110 may have any planar shape capable of limiting a viewing angle of light emitted from the first emitting area. For example, the first barrier pattern 110 may have circular or polygonal planar shape.

Figure 3:
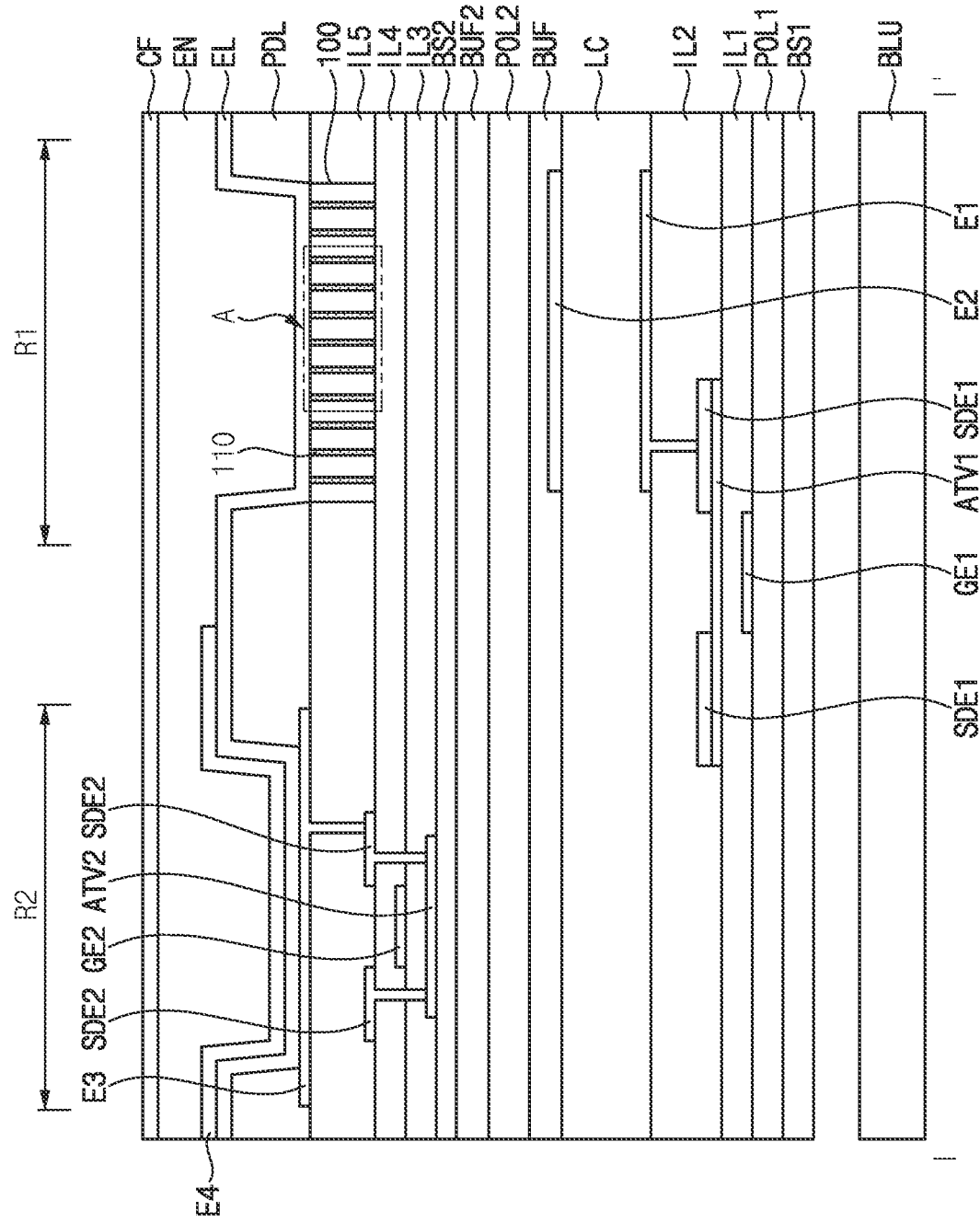
FIG. 3 is a cross-sectional view illustrating an embodiment of a structure of a pixel included in the display device.

FIG. 3 is a cross-sectional view of a structure of a pixel included in the display device according to an embodiment. FIG. 3 is a cross-sectional view of a display device along line I-I' of FIG. 2.

Referring to FIG. 3, the first pixel PXR may include a backlight unit BLU, a first base substrate BS1, a first polarization layer POL1, a first insulation layer IL1, a second insulation layer IL2, a liquid crystal layer LC, a first buffer layer BUF, a second polarization layer POL2, a second buffer layer BUF2, a second base substrate BS2, a third insulation layer IL3, a fourth insulation layer IL4, a fifth insulation layer IL5, a pixel defining layer PDL, a light emitting layer EL, an encapsulation layer EN, a color filter layer CF, a first active layer ATV1, a first gate electrode GE1, a first source-drain electrode SDE1, a first electrode E1, a second electrode E2, a second active layer ATV2, a second gate electrode GE2, a second source-drain electrode SDE2, a third electrode E3, a fourth electrode E4, and a first barrier pattern layer 100.

The backlight unit BLU may include a material which emits light. For example, the backlight unit BLU may include a light emitting diode (LED). The backlight unit BLU may emit light in a direction toward the liquid crystal layer LC, e.g., a light emitting direction. The backlight unit BLU may emit light and provide the light to the liquid crystal layer LC.

The first base substrate BS1 may be disposed on the backlight unit BLU. The first base substrate BS1 may include a transparent material through which light emitting from the backlight unit BLU passes in the light emitting direction. For example, the first base substrate BS1 may include glass, plastic, etc.

The first polarization layer POL1 may be disposed on the first base substrate BS1. The first polarization layer POL1 may polarize light emitted from the backlight unit BLU.

The first gate electrode GE1 may be disposed on the first polarization layer POL1. The first gate electrode GE1 may include a conductive material.

The first insulation layer IL1 may be disposed on the first polarization layer POL1. The first insulation layer IL1 may cover the first gate electrode GE1.

The first active layer ATV1 may be disposed on the first insulation layer IL1. The first active layer ATV1 may include semiconductor material.

The first source-drain electrode SDE1 may be disposed on the first active layer ATV1. The first source-drain electrode SDE1 may electrically contact at least a portion of the first active layer ATV1. The first gate electrode GE1, the first active layer ATV1, and the first source-drain electrode SDE1 may define a first driving transistor.

The second insulation layer IL2 may be disposed on the first insulation layer ILL The second insulation layer IL2 may cover the first active layer ATV1 and the first source-drain electrode SDE1.

The first electrode E1 may be disposed on the second insulation layer IL2. The first electrode E1 may electrically contact the first source-drain electrode SDE1, that is, may be electrically connected to the first driving transistor at the first source-drain electrode SDE1. At least a portion of the first electrode E1 may overlap (or correspond to) the first emitting area R1, along the thickness direction of the display device. In an embodiment, the first electrode E1 may not overlap the second emitting area R2. As not overlapping, elements may be adjacent to each other or spaced apart from each other along a planar direction (e.g., along the plane defined by the first direction D1 and the second direction D2 crossing each other, along an underlying layer such as a substrate or insulating layer like the first base substrate BS1, the first insulation layer IL1, etc.).

The liquid crystal layer LC may be disposed on the first electrode E1. The liquid crystal layer LC may change a phase of light passing through the layer, according to electrical signals of the first electrode E1 and the second electrode E2 facing each other with the liquid crystal layer LC therebetween.

The second electrode E2 may be disposed on the liquid crystal layer LC. At least a portion of the second electrode E2 may overlap the first emitting area R1. In an embodiment, the second electrode E2 may not overlap the second emitting area R2. A collection of layers including the first electrode E1, the second electrode E2 facing the first electrode E1, and the liquid crystal layer LC between the first electrode E1 and the second electrode E2 which face each other, may define a first light emitting element. Alternatively, the backlight unit BLU with or without the collection of layers of the first electrode E1, the second electrode E2 and the liquid crystal layer LC, may define the first light emitting element.

The first buffer layer BUF may be disposed on the liquid crystal layer LC. The first buffer layer BUF may cover the second electrode E2. The first buffer layer BUF may include an inorganic insulation material.

The second polarization layer POL2 may be disposed on the first buffer layer BUF. The second polarization layer POL2 may selectively transmit light having a specific phase among light passing through the liquid crystal layer LC.

The second buffer layer BUF2 may be disposed on the second polarization layer POL2. The second buffer layer BUF2 may include an inorganic insulation material.

The second base substrate BS2 may be disposed on the second buffer layer BUF2. The second base substrate BS2 may include a transparent material. For example, the second base substrate BS2 may include glass, plastic, etc.

The second active layer ATV2 may be disposed on the second base substrate BS2. The second active layer ATV2 may include semiconductor material.

The third insulation layer IL3 may be disposed on the second base substrate BS2. The third insulation layer IL3 may cover the second active layer ATV2.

The second gate electrode GE2 may be disposed on the third insulation layer IL3. The second gate electrode GE2 may include a conductive material.

The fourth insulation layer IL4 may be disposed on the third insulation layer IL3. The fourth insulation layer IL4 may cover the second gate electrode GE2.

The second source-drain electrode SDE2 may be disposed on the fourth insulation layer IL4. The second source-drain electrode SDE2 may electrically contact at least a portion of the second active layer ATV2. The second active layer ATV2, the second gate electrode GE2, and the second source-drain electrode SDE2 may define a second driving transistor.

The fifth insulation layer IL5 may be disposed on the fourth insulation layer IL4. The fifth insulation layer IL5 may cover the second source-drain electrode SDE2.

The third electrode E3 may be disposed on the fifth insulation layer IL5. The third electrode E3 may electrically contact the second source-drain electrode SDE2.

The pixel defining layer PDL may be disposed on the fifth insulation layer IL5. The pixel defining layer PDL may define a first opening exposing at least a portion of the third electrode E3 to outside the pixel defining layer PDL. The first opening may overlap the second emitting area R2.

The light emitting layer EL may be disposed on the third electrode E3 in the first opening. The light emitting layer EL may also extend from inside the first opening to be disposed extended along a sidewall of the pixel defining layer PDL and along an upper surface of the pixel defining layer PDL. The light emitting layer EL may be disposed to overlap the first emitting area R1 and the second emitting area R2. In an embodiment, the light emitting layer EL may include an organic light emitting material. In this case, the light emitting layer EL may further include at least one of electron injection layer, electron transport layer, hole injection layer, and a hole transport layer.

The fourth electrode E4 may be disposed on the light emitting layer EL. The fourth electrode E4 may define a second opening overlapping the first emitting area R1. A collection of layers including the third electrode E3, the fourth electrode E4 facing the third electrode E3, and the emitting layer EL between the third electrode E3, the fourth electrode E4 which face each other, may define a second light emitting element.

The encapsulation layer EN may be disposed on the fourth electrode E4. In an embodiment, the encapsulation layer EN may include a first inorganic encapsulation layer, an organic encapsulation layer, and a second inorganic encapsulation layer sequentially stacked.

The color filter layer CF may be disposed on the encapsulation layer EN. The color filter layer CF may selectively transmit light of a specific wavelength.

The first barrier pattern layer 100 may be disposed to overlap the first emitting area R1. The first barrier pattern layer 100 may be disposed between the second base substrate BS2 and the pixel defining layer PDL. For example, as shown in FIG. 3, the first barrier pattern layer 100 may be disposed on the fourth insulation layer IL4 to penetrate the fifth insulation layer IL5. The first barrier pattern layer 100 together with a solid portion of the fifth insulation layer IL5 may together define a barrier pattern layer.

The first barrier pattern layer 100 may include the first barrier pattern 110. Light emitted from the backlight unit BLU and passing through the liquid crystal layer LC may pass through the first barrier pattern 110 to have a relatively narrow viewing angle. Accordingly, an image having a narrow viewing angle may be displayed in (or at) the first emitting area R1.

FIG. 3 illustrates an embodiment which the first barrier pattern layer 100 penetrates the fifth insulation layer IL5 and is formed on the fourth insulation layer IL4, but the invention is not limited thereto. The first barrier pattern layer 100 may be disposed at various positions disposed between the pixel defining layer PDL and the second base substrate BS2 and overlapping the first emitting area R1. For example, the first barrier pattern layer 100 may penetrate the fourth insulation layer IL4 and/or the third insulation layer IL3 and may be disposed on the second base substrate BS2.

Figure 4:
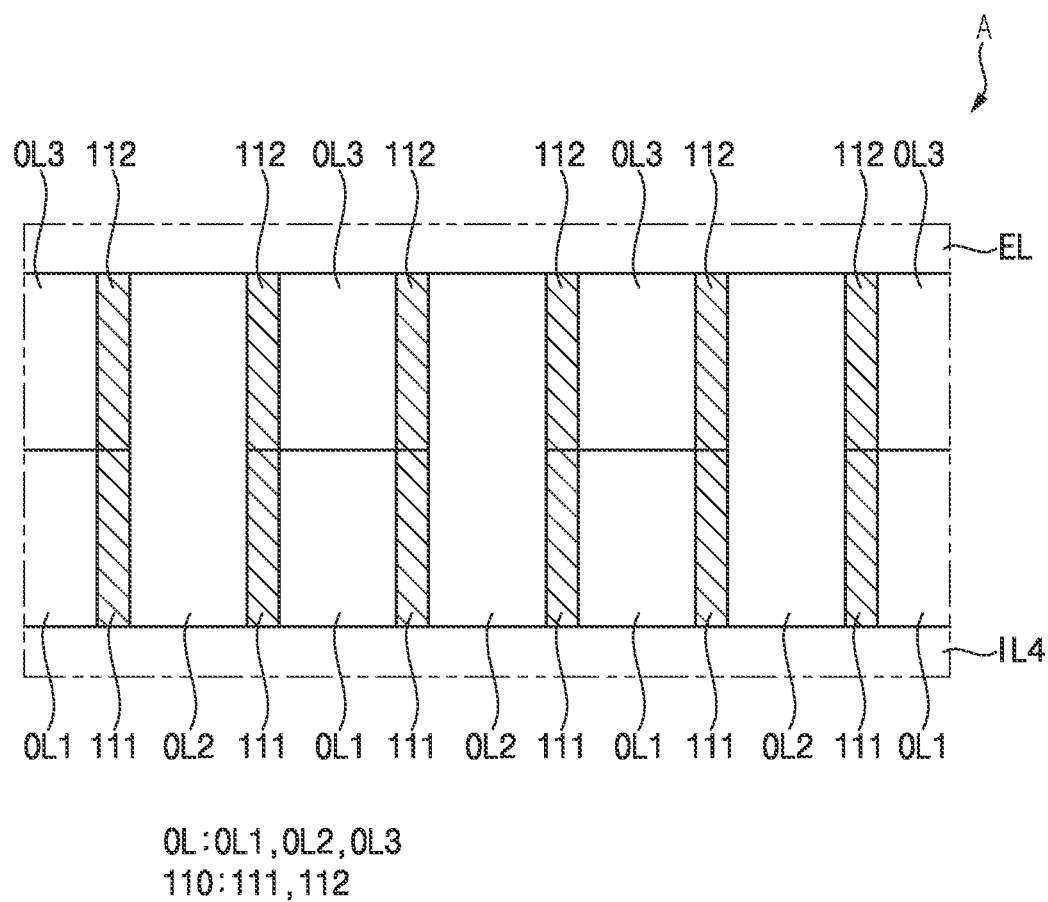
FIG. 4 is an enlarged cross-sectional view of area A of FIG. 3.

FIG. 4 is a cross-sectional view of enlarged area A of FIG. 3.

Referring to FIG. 4, the first barrier pattern layer 100 may include the first barrier pattern 110 and an organic layer OL.

The first barrier pattern 110 may be disposed substantially perpendicular to an upper surface of the fourth insulation layer IL4. The first barrier pattern 110 may include a light blocking material. For example, the first barrier pattern 110 may include an inorganic insulation material having a relatively large light absorption.

The organic layer OL may be disposed adjacent to patterns of the first barrier pattern 110. The organic layer OL may include an organic material having a relatively large light transmittance.

Referring to FIGS. 3 and 4, the first barrier pattern 110 may include a plurality of barrier walls, to define a barrier wall pattern. Each of the barrier walls may be protruded from the upper surface of the fourth insulation layer IL4, such as being perpendicular thereto. Referring to FIGS. 3 and 4, taken with FIG. 2 (or FIG. 1), each of the plurality of barrier walls within the barrier wall pattern may have a bar shape in a plan view (e.g., a planar shape). The bar shape may extend along the plane defined by the first and second directions D1 and D2 crossing each other, where a length of the bar shape extends along the first direction D1 and a width of the bar shape extends along the second direction D2.

In an embodiment, each of the barrier patterns (or barrier walls) of the first barrier pattern 110 may include a lower barrier pattern 111 and an upper barrier pattern 112, and the organic layer OL may include a first organic layer OL1, a second organic layer OL2, and a third organic layer OL3. The lower barrier pattern 111 and the upper barrier pattern 112 may each be provided in plural including a plurality of lower barrier patterns 111 corresponding to a plurality of upper barrier patterns 112. A lower barrier pattern 111 and an upper barrier pattern 112 may together form a barrier wall. In an embodiment, a single one of the lower barrier pattern 111 or a single one of the upper barrier pattern 112 may form a barrier wall.

The first barrier pattern 110 may contact a side surface of the first organic layer OL1. As being in contact, elements may form an interface therebetween, without being limited thereto. In an embodiment, forming (or providing) the lower barrier pattern 111 may include forming the first organic layer OL1 on the fourth insulation layer IL4, forming a inorganic insulation material covering the fourth insulation layer IL4 and the first organic layer OL1, and etching the inorganic insulation material to provide a plurality of lower barrier patterns 111 spaced apart from each other along the fourth insulation layer IL4. In this case, in the etching the inorganic insulation material, a portion of the inorganic insulation material may be removed by anisotropic dry etching, and accordingly, a residue of the inorganic insulation material may form the lower barrier pattern 111.

A portion of the upper barrier pattern 112 may be disposed on the lower barrier pattern 111, and the upper barrier pattern 112 may contact a side surface of the second organic layer OL2. In an embodiment, after forming the lower barrier pattern 111, forming the upper barrier pattern 112 may include forming the second organic layer OL2 on the fourth insulation layer IL4, forming an inorganic insulation material covering the fourth insulation layer IL4 and the second organic layer OL2, and etching the inorganic insulation material to provide a plurality of upper barrier patterns 112 spaced apart from each other along the fourth insulation layer IL4. In this case, in the etching the inorganic insulation material, a portion of the inorganic insulation material may be removed by anisotropic dry etching, and accordingly, a residue of the inorganic insulation material may form the upper barrier pattern 112.

The third organic layer OL3 may be disposed on the first organic layer OL1. The third organic layer OL3 together with the first organic layer OL1 may together form an organic layer pattern between the plurality of barrier walls within the first barrier pattern 110. In an embodiment, after forming the upper barrier pattern 112, the third organic layer OL3 may be formed on the first organic layer OL1.

FIG. 4 shows an embodiment in which a barrier wall of the first barrier pattern 110 includes the lower barrier pattern 111 and the upper barrier pattern 112, but the invention is not limited thereto. For example, a barrier wall of the first barrier pattern 110 may include three barrier patterns sequentially stacked to be substantially perpendicular to the upper surface of the fourth insulation layer IL4.

Figure 5:
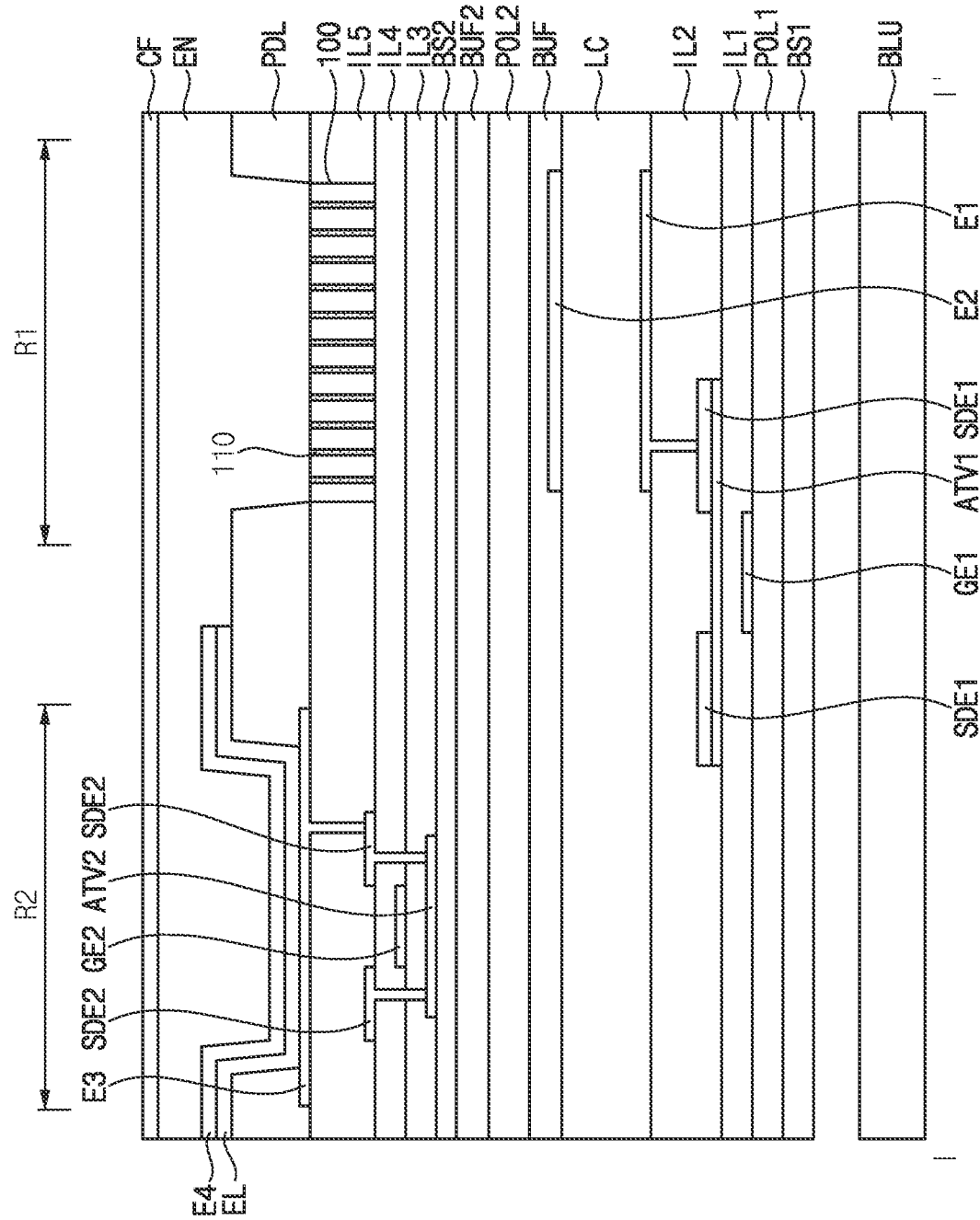
FIG. 5 is a cross-sectional view illustrating an embodiment of a structure of a pixel included in the display device.

FIG. 5 is a cross-sectional view illustrating an embodiment of a structure of a pixel included in the display device according to an embodiment. Description substantially same or similar to the description with reference to FIG. 3 may be omitted.

Referring to FIG. 5, in the first emitting area R1, the light emitting layer EL may be omitted. Accordingly, light emitted from the backlight unit BLU and sequentially passing through the liquid crystal layer LC and the first barrier pattern layer 100 may not pass through the light emitting layer EL. That is, the light emitting layer EL may include a plurality of fourth openings. A fourth opening may expose the first barrier pattern layer 100 to outside the light emitting layer EL.

Figure 6:
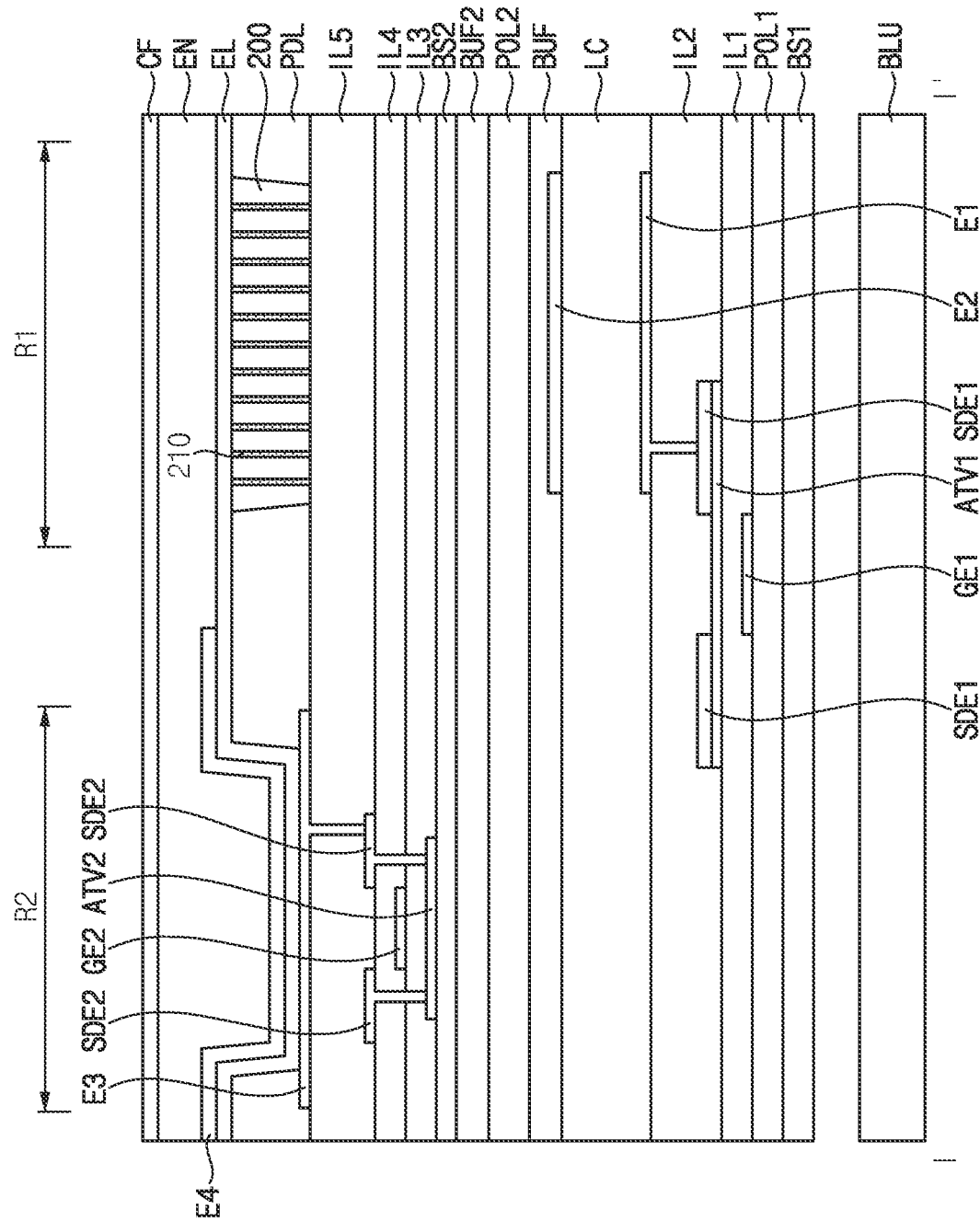
FIG. 6 is a cross-sectional view illustrating an embodiment of a structure of a pixel included in the display device.

FIG. 6 is a cross-sectional view illustrating an embodiment of a structure of a pixel included in the display device according to an embodiment. Description substantially same or similar to the description with reference to FIG. 3 may be omitted.

Referring to FIG. 6, the pixel defining layer PDL may define a third opening overlapping the first emitting area R1. In this case, a second barrier pattern layer 200 may be disposed in the third opening. The second barrier pattern layer 200 may include a second barrier pattern 210. The second barrier pattern layer 200 and the second barrier pattern 210 may be substantially same as the first barrier pattern layer 100 and the first barrier pattern 110 described with reference to FIG. 3 and FIG. 4. Accordingly, a viewing angle of light emitted from the backlight unit BLU and passing through the liquid crystal layer LC may be adjusted by the second barrier pattern 210, and an image having a narrow viewing angle may be displayed in the first emitting area R1.

Figure 7:
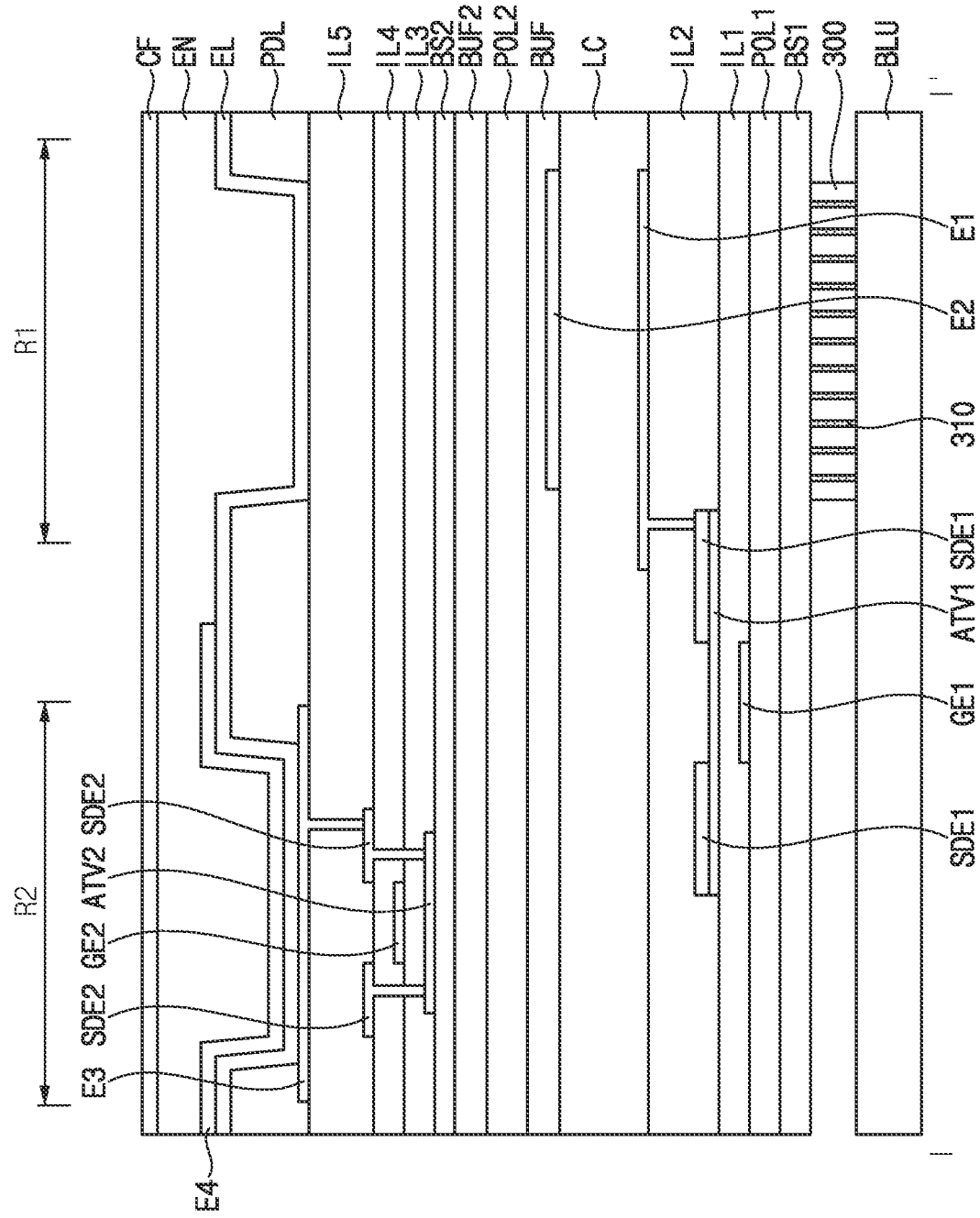
FIG. 7 is a cross-sectional view illustrating an embodiment of a structure of a pixel included in the display device.

FIG. 7 is a cross-sectional view illustrating an embodiment of a structure of a pixel included in the display device according to an embodiment. Description substantially same or similar to the description with reference to FIG. 3 may be omitted.

Referring to FIG. 7, a third barrier pattern layer 300 may be disposed between the backlight unit BLU and the first base substrate BS1. The third barrier pattern layer 300 may include a third barrier pattern 310. The third barrier pattern layer 300 may overlap the first emitting area R1. The third barrier pattern layer 300 and the third barrier pattern 310 may be substantially same as the first barrier pattern layer 100 and the first barrier pattern 110 described with reference to FIG. 3 and FIG. 4. Accordingly, a viewing angle of light emitted from the backlight unit BLU and passing through the liquid crystal layer LC may be adjusted by the third barrier pattern 310, and an image having a narrow viewing angle may be displayed in the first emitting area R1.

Figure 8:
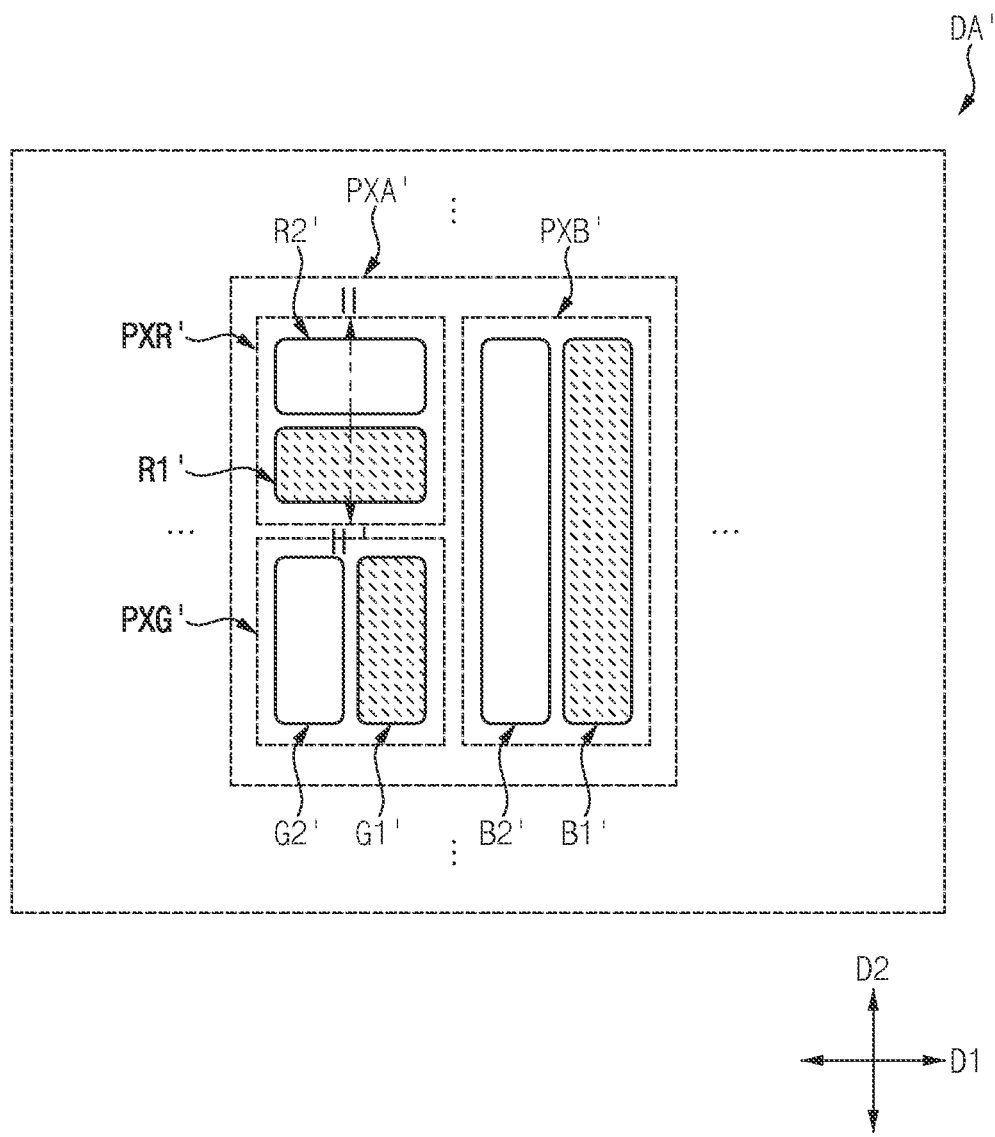
FIG. 8 is a plan view illustrating a display area of a display device according to an embodiment.

FIG. 8 is a plan view illustrating a display area DA' of a display device according to an embodiment.

Referring to FIG. 8, a plurality of pixels may be disposed in a display area DA'. The plurality of pixels may include a first pixel PXR', a second pixel PXG', and a third pixel PXB'. The first pixel PXR' may be a pixel emitting red light, the second pixel PXG' may be a pixel emitting green light, and the third pixel PXB' may be a pixel emitting blue light. The plurality of pixels may be arranged in a first direction D1 and a second direction D2 crossing the first direction D1.

Each of the plurality of pixels may include a first emitting area and a second emitting area. For example, the first pixel PXR' may include first and second emitting areas R1' and R2', the second pixel PXG' may include first and second emitting areas G1' and G2', and the third pixel PXB' may include first and second emitting areas B1' and B2'.

The first emitting area may be an area emitting light having a relatively narrow viewing angle. The second emitting area may be an area emitting light having a relatively wide viewing angle.

In an embodiment, when a display device is driven in a narrow viewing angle mode, light may be emitted from the first emitting area, and light may not be emitted from the second emitting area.

In an embodiment, when the display device is driven in a wide viewing angle mode, light may not be emitted from the first emitting area, and light may be emitted from the second emitting area. In an embodiment, when the display device is driven in the wide viewing angle mode, light may be emitted from each of the first emitting area and the second emitting area.

Figure 9:
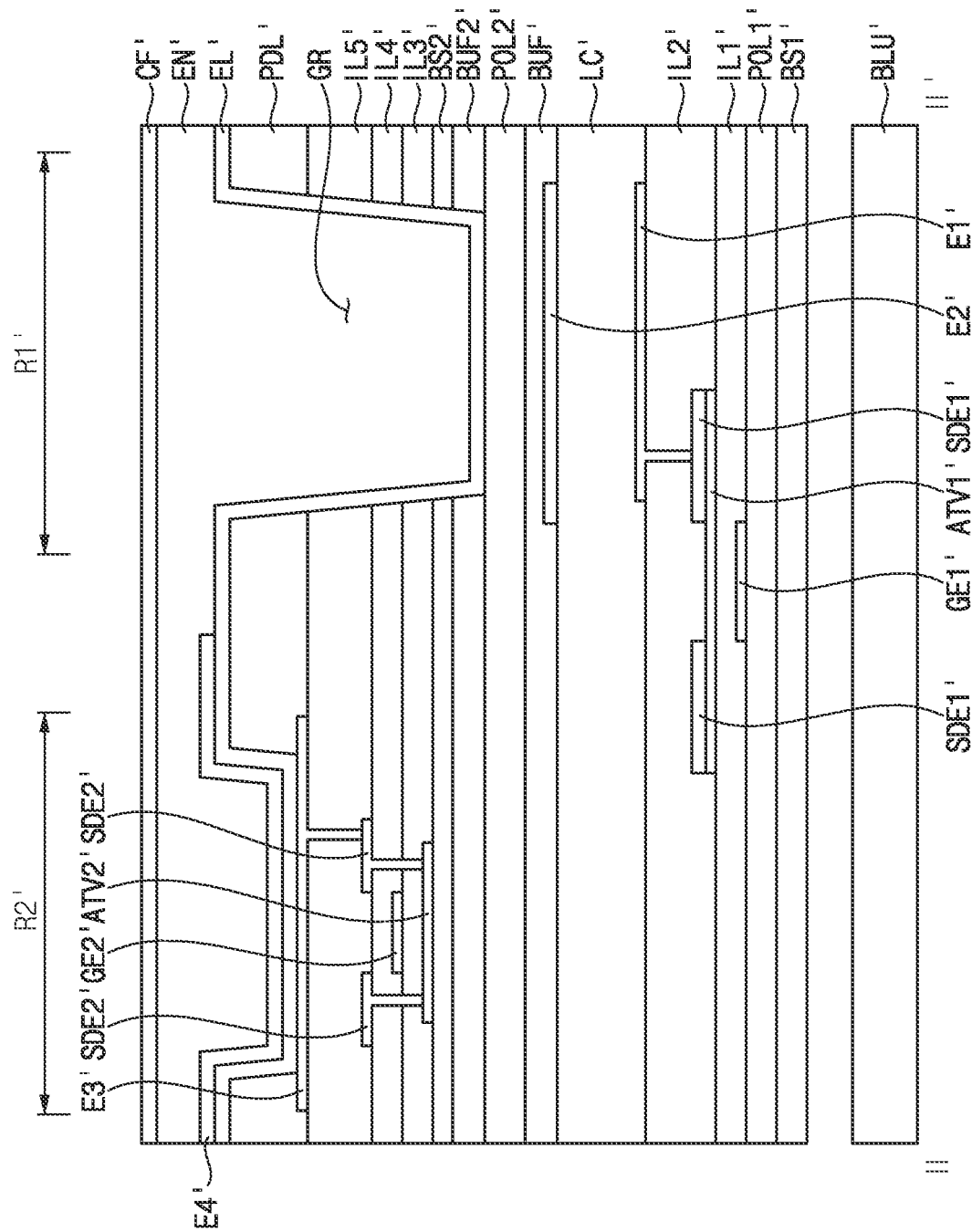
FIG. 9 is a cross-sectional view illustrating an embodiment of a structure of a pixel included in the display device.

FIG. 9 is a cross-sectional view illustrating an embodiment of a structure of a pixel included in the display device according to an embodiment. Description substantially same or similar to the description with reference to FIG. 3 may be omitted. FIG. 9 is a cross-sectional view of a display device along line II-II' of FIG. 8.

Referring to FIG. 9, the first pixel PXR' may include a backlight unit BLU', a first base substrate BS1', a first polarization layer POL1', a first insulation layer IL1', a second insulation layer IL2', a liquid crystal layer LC', a first buffer layer BUF', a second polarization layer POL2', a second buffer layer BUF2', a second base substrate BS2', a third insulation layer IL3', a fourth insulation layer IL4', a fifth insulation layer IL5', a pixel defining layer PDL', a light emitting layer EL', an encapsulation layer EN', a color filter layer CF', a first active layer ATV1', a first gate electrode GE1', a first source-drain electrode SDE1', a first electrode E1', a second electrode E2', a second active layer ATV2', a second gate electrode GE2', a second source-drain electrode SDE2', a third electrode E3', and a fourth electrode E4'.

Light emitted from the backlight unit BLU' may have a light emitting direction of a straight light. The straight light may be light traveling in a direction substantially perpendicular to the first direction D1 (in FIG. 1 and FIG. 2) and the second direction D2 (in FIG. 1 and FIG. 2)

In this case, a middle substrate defined by the second buffer layer BUF2', the second base substrate BS2', the third insulation layer IL3', the fourth insulation layer IL4', and the fifth insulation layer IL5' together with each other, may define a groove GR overlapping the first emitting area R1'. Respective openings in the above layers may be aligned with each other to form the groove GR. In an embodiment, when the pixel defining layer PDL' defines a third opening overlapping the first emitting area R1', the third opening may overlap the groove GR. That is, the respective openings in the middle substrate and the pixel defining layer PDL may together define the groove GR.

The straight light emitted from the backlight unit BLU' may sequentially pass through the liquid crystal layer LC' and the middle substrate at the groove GR, to remain straight and be emitted as straight light at the first emitting area R1'. Accordingly, an image having a narrow viewing angle may be displayed in the first emitting area R1'. Since a portion of layers following the second polarization layer POL2', and between the encapsulation layer EN' and the second polarization layer POL2' is omitted to form the groove GR, light transmission is not inhibited at the groove GR, and the straight light may continue from the second polarization layer POL2' and through the encapsulation layer EN' to provide the narrow viewing angle at the first emitting area R1'.

Figure 10:
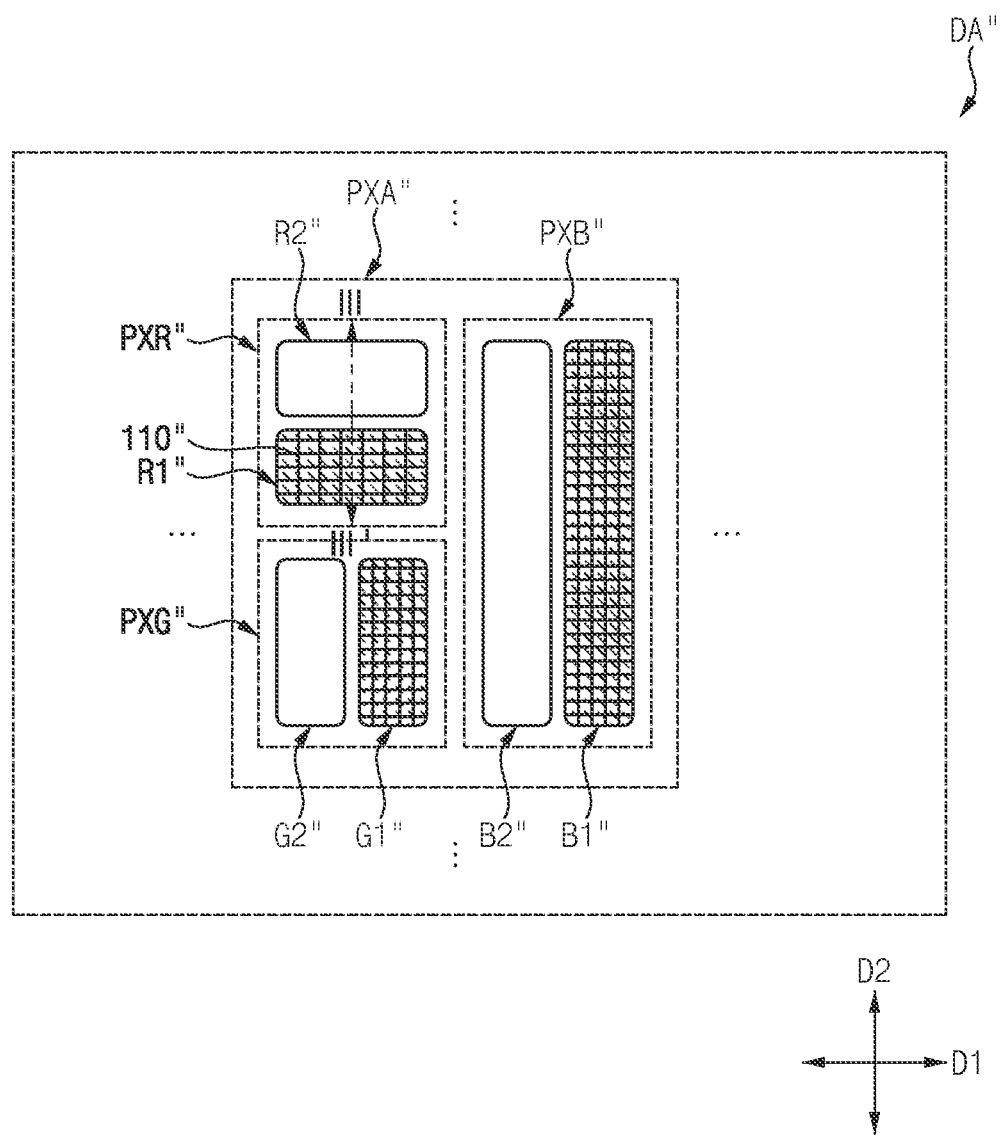
FIG. 10 is a plan view illustrating a display area of a display device according to an embodiment.

FIG. 10 is a plan view illustrating a display area DA" of a display device according to an embodiment.

Referring to FIG. 10, a plurality of pixels may be disposed in a display area DA". The plurality of pixels may include a first pixel PXR", a second pixel PRG", and a third pixel PXB". The first pixel PXR", the second pixel PXG", and a third pixel PXB" may be substantially same as the first pixel PXR, the second pixel PXG, and a third pixel PXB described with reference to FIG. 1 and FIG. 2.

Each of the plurality of pixels may include a first emitting area and a second emitting area. For example, the first pixel PXR" may include first and second emitting areas R1" and R2", the second pixel PXG" may include first and second emitting areas G1" and G2", and the third pixel PXB" may include first and second emitting areas B1" and B2". A plurality of pixels may be disposed within a pixel area PXA".

The first emitting area may be an area emitting light having a relatively narrow viewing angle. In an embodiment, a first barrier pattern 110" may be disposed in the first emitting area. The first barrier pattern 110" may be substantially same as the first barrier pattern 110 described with reference to FIG. 2.

In an embodiment, when a display device is driven in a narrow viewing angle mode, light may be emitted from the first emitting area, and light may not be emitted from the second emitting area.

In an embodiment, when the display device is driven in a wide viewing angle mode, light may not be emitted from the first emitting area, and light may be emitted from the second emitting area. In an embodiment, when the display device is driven in the wide viewing angle mode, light may be emitted from each of the first emitting area and the second emitting area.

Planar shape of the first barrier pattern 110" is not limited to the planar shape of the first barrier pattern 110" illustrated in FIG. 10. The first barrier pattern 110" may have any planar shape capable of limiting a viewing angle of light emitted from the first emitting area. For example, the first barrier pattern 110" may have circular or polygonal planar shape.

Figure 11:
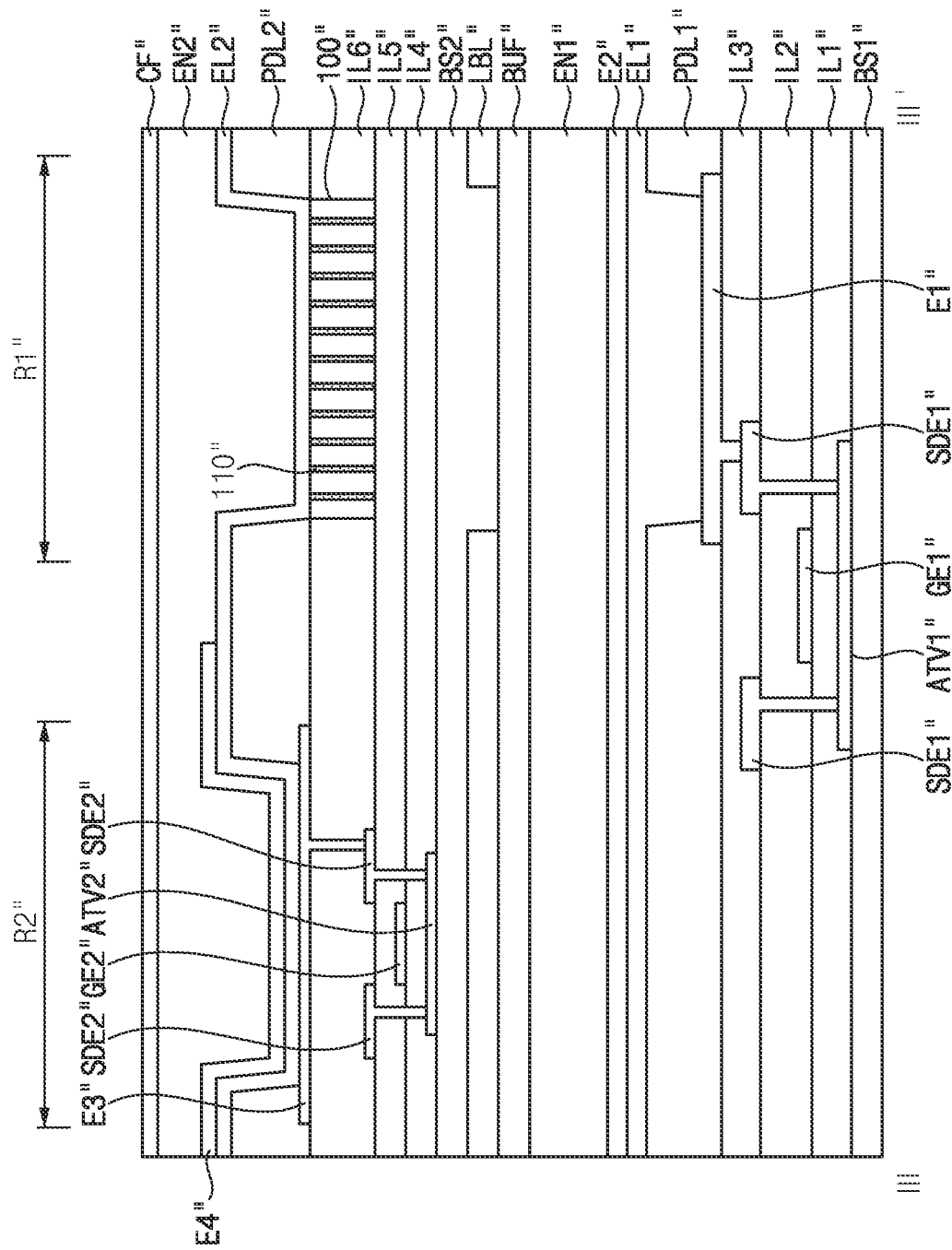
FIG. 11 is a cross-sectional view illustrating an embodiment of a structure of a pixel included in the display device.

FIG. 11 is a cross-sectional view illustrating an embodiment of a structure of a pixel included in the display device according to an embodiment. FIG. 11 is a cross-sectional view of a display device along line III-III' of FIG. 10.

Referring to FIG. 11, the first pixel PXR" may include a first base substrate BS1", a first insulation layer IL1", a second insulation layer IL2", a third insulation layer IL3", a first pixel defining layer PDL1", a first light emitting layer EL1", a first encapsulation layer EN1", a first buffer layer BUF", a light blocking layer LBL", a second base substrate BS2", a fourth insulation layer IL4", a fifth insulation layer IL5", a sixth insulation layer IL6", a second pixel defining layer PDL2", a second light emitting layer EL2", a second encapsulation layer EN2", a color filter layer CF", a first active layer ATV1", a first gate electrode GE1", a first source-drain electrode SDE1", a first electrode E1", a second electrode E2", a second active layer ATV2", a second gate electrode GE2", a second source-drain electrode SDE2", a third electrode E3", and a fourth electrode E4".

The first base substrate BS1" may include a transparent material. For example, the first base substrate BS1" may include glass, plastic, etc.

The first active layer ATV1" may be disposed on the first base substrate BS1". The first active layer ATV1" may include a semiconductor material.

The first insulation layer IL1" may be disposed on the first base substrate BS1". The first insulation layer IL1" may cover the first active layer ATV1".

The first gate electrode GE1" may be disposed on the first insulation layer IL1". The first gate electrode GE1" may include a conductive material.

The second insulation layer IL2" may be disposed on the first insulation layer IL1". The second insulation layer IL2" may cover the first gate electrode GE1".

The first source-drain electrode SDE1" may be disposed on the second insulation layer IL2". The first source-drain electrode SDE1" may electrically contact the first active layer ATV1". The first active layer ATV1", the first gate electrode GE1", and the first source-drain electrode SDE1" may define a first driving transistor.

The third insulation layer IL3" may be disposed on the second insulation layer IL2". The third insulation layer IL3" may cover the first source-drain electrode SDE1".

The first electrode E1" may be disposed on the third insulation layer IL3". The first electrode E1" may electrically contact the first source-drain electrode SDE1". At least a portion of the first electrode E1" may overlap the first emitting area R1".

The first pixel defining layer PDL1" may be disposed on the first electrode E1". The first pixel defining layer PDL1" may define a first opening exposing a portion of the first electrode E1". The first opening may overlap the first emitting area R1".

The first light emitting layer EL1" may be disposed in the first opening. In an embodiment, the first light emitting layer EL1" may include an organic light emitting material.

The second electrode E2" may be disposed on the first light emitting layer EL1". A collection of layers including the first electrode E1", the second electrode E2" facing the first electrode E1", and the first light emitting layer EL1" between the first electrode E1" and the second electrode E2" which face each other, may define a first light emitting element.

The first encapsulation layer EN1" may be disposed on the second electrode E2". In an embodiment, the first encapsulation layer EN1" may include a first inorganic encapsulation layer, an organic encapsulation layer, and a second inorganic encapsulation layer sequentially stacked.

The first buffer layer BUF" may be disposed on the first encapsulation layer EN1". The first buffer layer BUF" may include an insulating material.

The second base substrate BS2" may be disposed on the first buffer layer BUF". The second base substrate BS2" may include a transparent material. For example, the second base substrate BS2" may include glass, plastic, etc.

The light blocking layer LBL" may be disposed on the first buffer layer BUF". The light blocking layer LBL" may define an opening overlap the first emitting area R1". The light blocking layer LBL" may block a portion of light emitted from the first light emitting layer EL1" so that the light emitted from the first light emitting layer EL1" does not proceed to the second emitting area R2". In an embodiment, the light blocking layer LBL" may be omitted.

The second active layer ATV2" may be disposed on the second base substrate BS2". The second active layer ATV2" may include a semiconductor material.

The fourth insulation layer IL4" may be disposed on the second base substrate BS2". The fourth insulation layer IL4" may cover the second active layer ATV2".

The second gate electrode GE2" may be disposed on the fourth insulation layer IL4". The second gate electrode GE2" may include a conductive material.

The fifth insulation layer IL5" may be disposed on the fourth insulation layer IL4". The fifth insulation layer IL5" may cover the second gate electrode GE2".

The second source-drain electrode SDE2" may be disposed on the fifth insulation layer IL5". The second source-drain electrode SDE2" may electrically contact the second active layer ATV2". The second active layer ATV2", the second gate electrode GE2", and the second source-drain electrode SDE2" may define a second driving transistor.

The sixth insulation layer IL6" may be disposed on the fifth insulation layer IL5". The sixth insulation layer IL6" may cover the second source-drain electrode SDE2".

The third electrode E3" may be disposed on the sixth insulation layer IL6". At least a portion of the third electrode E3" may overlap the second emitting area R2".

The second pixel defining layer PDL2" may be disposed on the third electrode E3". The second pixel defining layer PDL2" may define a second opening exposing a portion of the third electrode E3". The second opening may overlap the second emitting area R2".

The second light emitting layer EL2" may be disposed in the second opening. In an embodiment, in the first emitting area R1", the second light emitting layer EL2 may be removed.

The fourth electrode E4" may be disposed on the second light emitting layer EL2". The fourth electrode E4" may define a third opening overlapping the first emitting area R1".

The second encapsulation layer EN2" may be disposed on the fourth electrode E4". In an embodiment, the second encapsulation layer EN2" may include a first inorganic encapsulation layer, an organic encapsulation layer, and a second inorganic encapsulation layer sequentially stacked.

The color filter layer CF" may be disposed on the second encapsulation layer EN2". The color filter layer CF" may selectively transmit light of a specific wavelength.

The first barrier pattern layer 100" may be disposed to overlap the first emitting area R1". Specifically, the first barrier pattern layer 100" may be disposed between the second base substrate B52" and the second pixel defining layer PDL2". The first barrier pattern layer 100" may include the first barrier pattern 110". The first barrier pattern layer 100" and the first barrier pattern 110" may be substantially same as the first barrier pattern layer 100 and the first barrier pattern 110 described with reference to FIG. 3 and FIG. 4. The first barrier pattern layer 100" together with a solid portion of the sixth insulation layer IL6 may together define a barrier pattern layer.

Light emitted from the first light emitting layer EL1" may pass through the first barrier pattern 110" and may have a relatively narrow viewing angle. Accordingly, an image having a narrow viewing angle may be displayed in the first emitting area R1".

FIG. 11 illustrates an embodiment in which the first barrier pattern layer 100" penetrates the sixth insulation layer IL6" and is formed on the fifth insulation layer IL5", but the invention is not limited thereto. For example, the first barrier pattern layer 100" may penetrate the fifth insulation layer IL5" and the fourth insulation layer IL4" and may be formed on the second base substrate B52".

In an embodiment, in the first emitting area R1", the second light emitting layer EL2" may be removed (refer to FIG. 5). Accordingly, light emitted from the first light emitting layer EL1" may not pass through the second light emitting layer EL2".

Figure 12:
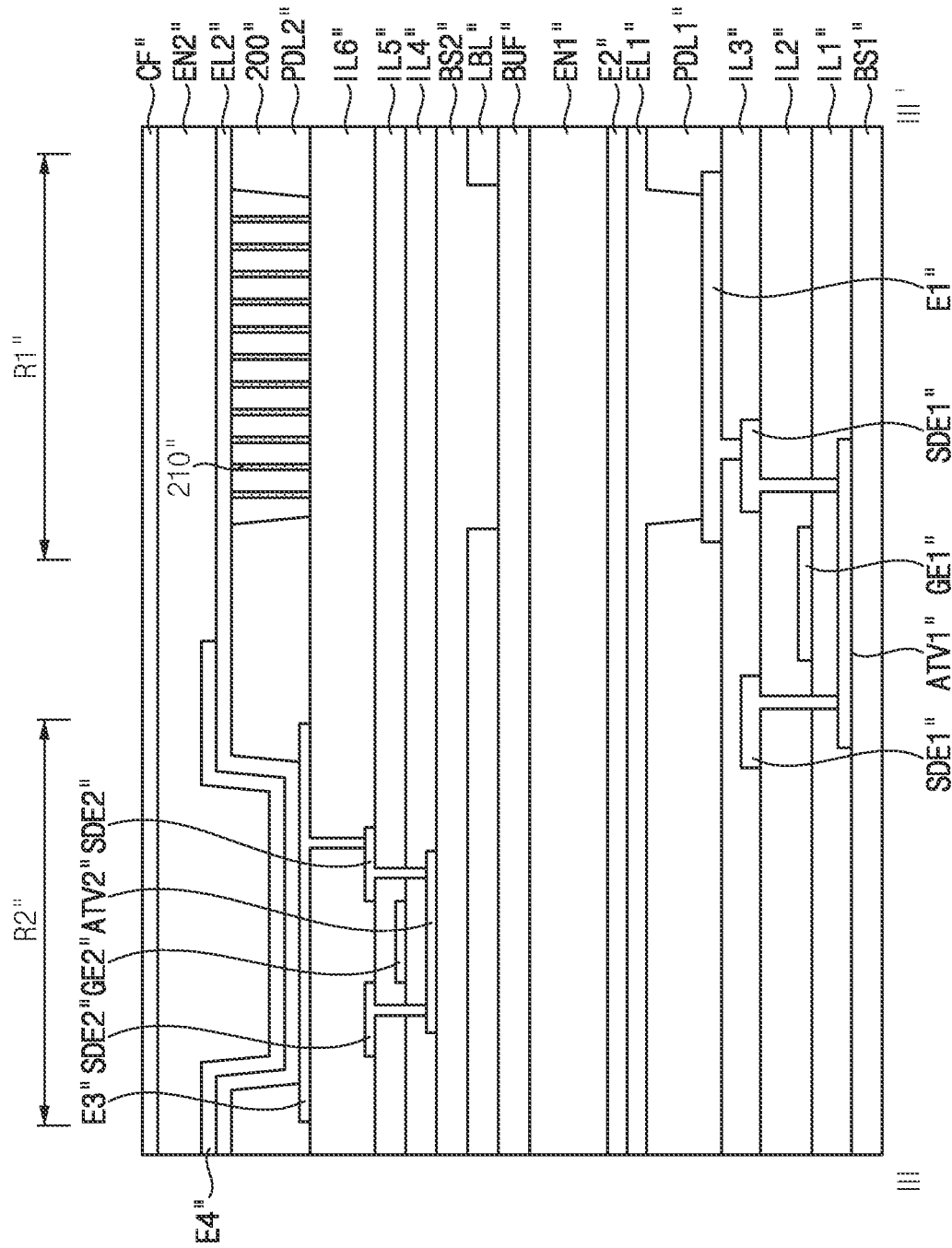
FIG. 12 is a cross-sectional view illustrating an embodiment of a structure of a pixel included in the display device.

FIG. 12 is a cross-sectional view illustrating an embodiment of a structure of a pixel included in the display device according to an embodiment. Description substantially same or similar to the description with reference to FIG. 11 may be omitted.

Referring to FIG. 12, the second pixel defining layer PDL2" may define an opening overlapping the first emitting area R1". A second barrier pattern layer 200" may be disposed in the opening. The second barrier pattern layer 200" may include a second barrier pattern 210". The second barrier pattern layer 200" and the second barrier pattern 210" may be substantially same as the first barrier pattern layer 100 and the first barrier pattern 110 described with reference to FIG. 3 and FIG. 4. Accordingly, a viewing angle of light emitted from the first light emitting layer EL1" may be adjusted by the second barrier pattern 210", and an image having a narrow viewing angle may be displayed in the first emitting area R1".

Although embodiments and implementations have been described herein, other embodiments and modifications will be apparent from this description. Accordingly, the invention is not limited to such embodiments, but rather to the broader scope of the appended claims and various obvious modifications and equivalent arrangements as would be apparent to a person of ordinary skill in the art.

What is claimed is:

1. A display device comprising:
    a first emitting area and a second emitting area which is spaced apart from the first emitting area;
    a first electrode facing a second electrode with a liquid crystal layer therebetween, each of the first electrode, the second electrode and the liquid crystal layer corresponding to the first emitting area;
    a third electrode facing a fourth electrode with a light emitting layer therebetween, each of the third electrode, the fourth electrode and the light emitting layer corresponding to the second emitting area;
    the fourth electrode defining an opening in the fourth electrode which corresponds to the first emitting area; and
    within the first emitting area, a barrier wall pattern layer spaced apart from the first electrode, the second electrode and the liquid crystal layer along a thickness direction of the display device.

2. The display device of claim 1, wherein the barrier wall pattern layer comprises a plurality of barrier wall patterns arranged spaced apart from each other on the second electrode.

3. The display device of claim 1, further comprising:
    a pixel defining layer on the second electrode, the pixel defining layer defining an opening which corresponds to the second emitting area and in which the light emitting layer is disposed,
    wherein the barrier wall pattern layer is between the second electrode and the pixel defining layer.

4. The display device of claim 2, further comprising:
    a pixel defining layer on the second electrode, the pixel defining layer defining:
        a first opening which corresponds to the second emitting area and in which the light emitting layer is disposed, and
        a second opening which corresponds to the first emitting area.

5. The display device of claim 4, wherein the plurality of barrier wall patterns is in the second opening of the pixel defining layer.

6. The display device of claim 1, further comprising:
    a backlight unit under the liquid crystal layer,
    wherein the barrier wall pattern layer is between the backlight unit and the first electrode.

7. The display device of claim 1, wherein the barrier wall pattern layer comprises:
    a plurality of first barrier patterns extending in a first direction and arranged in a second direction which crosses the first direction.

8. The display device of claim 7, wherein the barrier wall pattern layer further comprises:
    a plurality of second barrier patterns extending in the second direction and arranged in the first direction.

9. A display device comprising:
    a first emitting area and a second emitting area which is spaced apart from the first emitting area;
    a first electrode facing a second electrode with a liquid crystal layer therebetween, each of the first electrode, the second electrode and the liquid crystal layer corresponding to the first emitting area;
    a third electrode facing a fourth electrode with a light emitting layer therebetween, each of the third electrode, the fourth electrode and the light emitting layer corresponding to the second emitting area;
    the fourth electrode defining an opening in the fourth electrode which corresponds to the first emitting area;
    the second electrode and the third electrode spaced apart from each other along a thickness direction of the display device, and
    a middle substrate between the second electrode and the third electrode, the middle substrate comprising a driving transistor electrically connected to the third electrode.

10. The display device of claim 9, wherein the middle substrate defines a groove corresponding to the first emitting area and through which light from the liquid crystal layer is emitted in a direction perpendicular to the liquid crystal layer.

11. The display device of claim 1, further comprising:
a color filter layer corresponding to the first emitting area and the second emitting area,
wherein
light is emitted from the liquid crystal layer and the light emitting layer, in a light emitting direction, and
the color filter layer follows the liquid crystal layer and the light emitting layer, in the light emitting direction.

12. A display device comprising:
a first emitting area and a second emitting area which is spaced apart from the first emitting area;
a first electrode facing a second electrode with a first light emitting layer therebetween, each of the first electrode, the second electrode and the first light emitting layer corresponding to the first emitting area;
a third electrode facing a fourth electrode with a second light emitting layer therebetween, each of the third electrode, the fourth electrode and the second light emitting layer corresponding to the second emitting area;
the fourth electrode defining an opening in the fourth electrode which corresponds to the first emitting area; and
within the first emitting area, a barrier wall pattern layer spaced apart from the first electrode, the second electrode and the first light emitting layer along a thickness direction of the display device.

13. The display device of claim 12, wherein the barrier wall pattern layer comprises a plurality of barrier wall patterns arranged spaced apart from each other on the second electrode.

14. The display device of claim 12, further comprising:
a first pixel defining layer defining an opening in which the first light emitting layer is disposed, and
a second pixel defining layer defining an opening in which the second light emitting layer is disposed,
wherein the barrier wall pattern layer is between the second electrode and the second pixel defining layer.

15. The display device of claim 13, further comprising:
a first pixel defining layer defining an opening in which the first light emitting layer is disposed, and
a second pixel defining layer defining:
a first opening in which the second light emitting layer is disposed, and
a second opening corresponding to the first emitting area.

16. The display device of claim 15, wherein the plurality of barrier wall patterns is in the second opening of the second pixel defining layer.

17. The display device of claim 12, wherein the barrier wall pattern layer comprises:
a plurality of first barrier patterns extending in a first direction and arranged in a second direction which crosses the first direction.

18. The display device of claim 17, wherein the barrier wall pattern layer further comprises:
a plurality of second barrier patterns extending in the second direction and arranged in the first direction.

19. The display device of claim 12, further comprising:
a color filter layer corresponding to the first emitting area and the second emitting area,
wherein
light is emitted from the first light emitting layer and the second light emitting layer, in a light emitting direction, and
the color filter layer follows the first light emitting layer and the second light emitting layer, in the light emitting direction.

20. The display device of claim 9, further comprising a backlight unit which is under the liquid crystal layer and emits light toward the liquid crystal layer.

* * * * *